(No Model.)
J. W. WETMORE.
VEHICLE SPRING.
No. 252,825.
Patented Jan. 24, 1882.
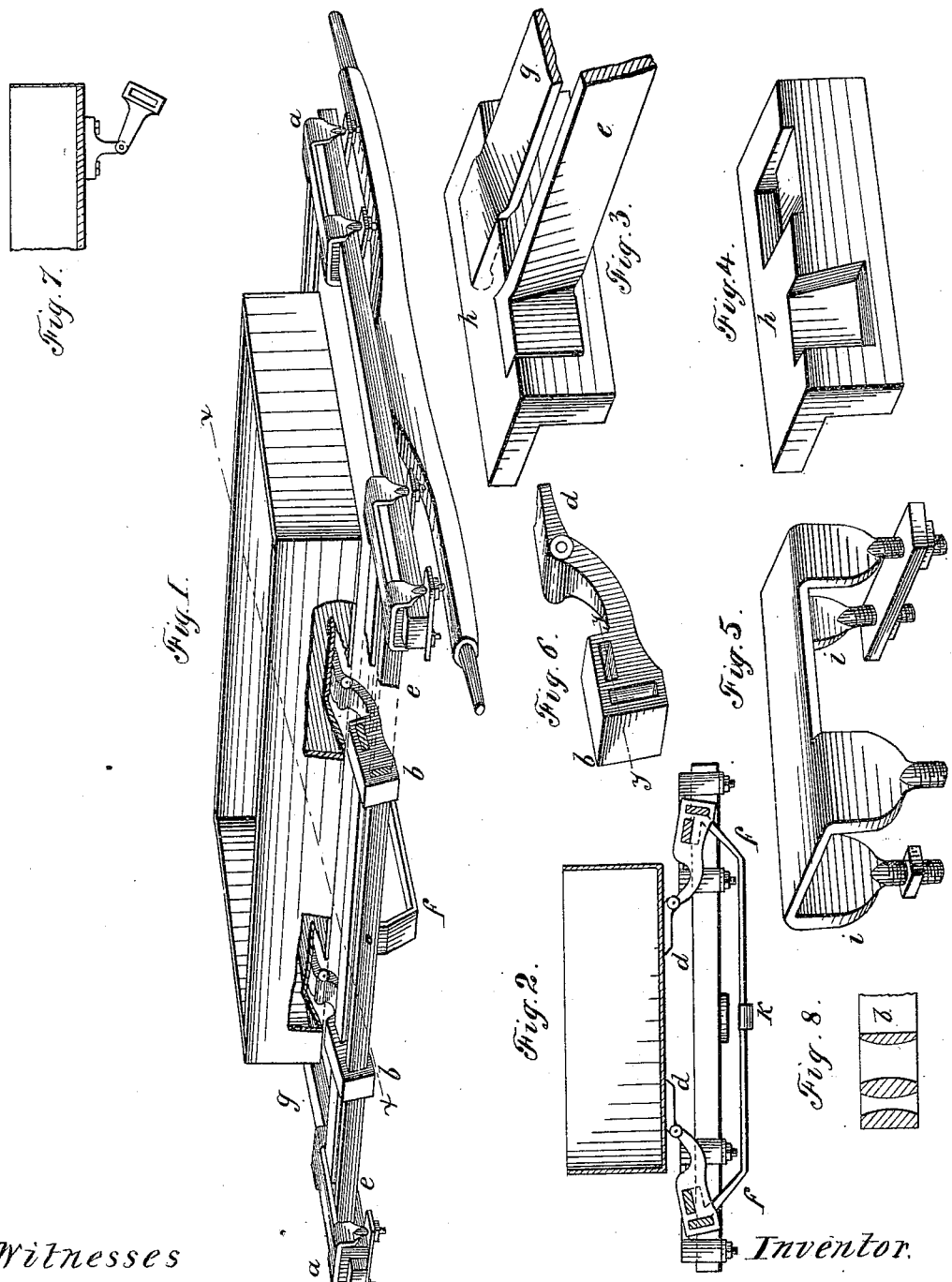
Witnesses
W. R. Edelen.
Richard Dudley
Inventor.
Jerome W. Wetmore

UNITED STATES PATENT OFFICE.

JEROME W. WETMORE, OF ERIE, PENNSYLVANIA.

VEHICLE=SPRING.

SPECIFICATION forming part of Letters Patent No. 252,825, dated January 24, 1882.

Application filed May 14, 1881. (No model.)

*To all whom it may concern:*

Be it known that I, JEROME W. WETMORE, a citizen of the United States, residing at Erie, in the county of Erie and State of Pennsylvania, have invented a new and useful Improvement in Longitudinal Torsion-Springs for Wagons and Buggies, of which the following is a specification.

My invention relates to longitudinal torsion-springs for vehicles; and the object of my improvement is to make a spring-steel side bar or other connecting-bar serve the purpose of a spring as well as a side or connecting bar. I attain this object by the devices illustrated in the accompanying drawings, in which—

Figure 1 is a perspective view; Fig. 2, a vertical section viewed from the plane $x\,x$; Fig. 3, an enlarged view of the end of the spring in its seat on the axle or bolster; Fig. 4, a view of the same seat for the spring; Fig. 5, a view of the clip for holding the spring in its seat; Fig. 7, an end view of the body of the buggy placed over the spring with the arm corresponding to $d$ fastened to the bottom and projecting down to the hinge. The use of this figure is to show that I do not confine myself to the longitudinal torsion-spring as a side-bar spring. Fig. 8 is a horizontal section in the plane $y\,y$, Fig. 6, showing the widening of the slot from the middle.

$d$, Fig. 6, is the end of the strap, which is bolted to the bottom of the vehicle. (Seen in Fig. 1, where the box and springs are broken away.) Instead of this may be used the half-elliptical spring, fastened in the usual way to the bottom of the body, or the arm of a torsion-spring so fastened.

The ends of the spring $e\,e$ may be attached to half-elliptical springs on the axle or bolster. The vertical bar $e\,e$ is fastened to the central cross-bar, $f$. The rivet-head at the middle of the bar $e\,e$ indicates this fastening; but to prevent the bar from being drilled and weakened a clip will connect $f$ and $e\,e$. The horizontal bar $g$ is not fastened to cross-bar $f$.

The spring $e\,e$ may be used without the bar $g$. This bar $g$ is designed to prevent the excessive side motion of the body of the vehicle. It will yield in its seat sufficiently not to resist the downward motion of the arms $b\,b$ against the torsional force of the spring $e\,e$. It is a narrower and thinner spring-bar placed very near to $e\,e$. $f\,f$, Fig. 2, is usually bolted to the reach $k$. This central cross-bar, $f$, holds the middle points of the springs $e\,e$, so that the torsional force of each arm $b\,b$ on the spring ends at $f$, making $e\,e$ equivalent to two springs.

A lip on the back side of the blocks, Figs. 3 and 4, is bent down like a flange over the edge of the axle or bo'ster, between the ears $i\,i$, Fig. 5.

What I claim is—

1. The vertical or oblique spring side bar, $e\,e$, when sustained in the middle and at each end without pivot-bearings, in combination with the arms $b\,b$, connecting it with the body of the vehicle, substantially as described.

2. The oblique or vertical spring side bar, $e\,e$, sustained in the middle and at each end without pivot-bearings, in combination with the horizontal spring-bar $g$ and arms $b\,b$, constructed and arranged substantially as described.

JEROME W. WETMORE.

Witnesses:
CRAIG T. RICE,
WM. P. HAYES.